UNITED STATES PATENT OFFICE.

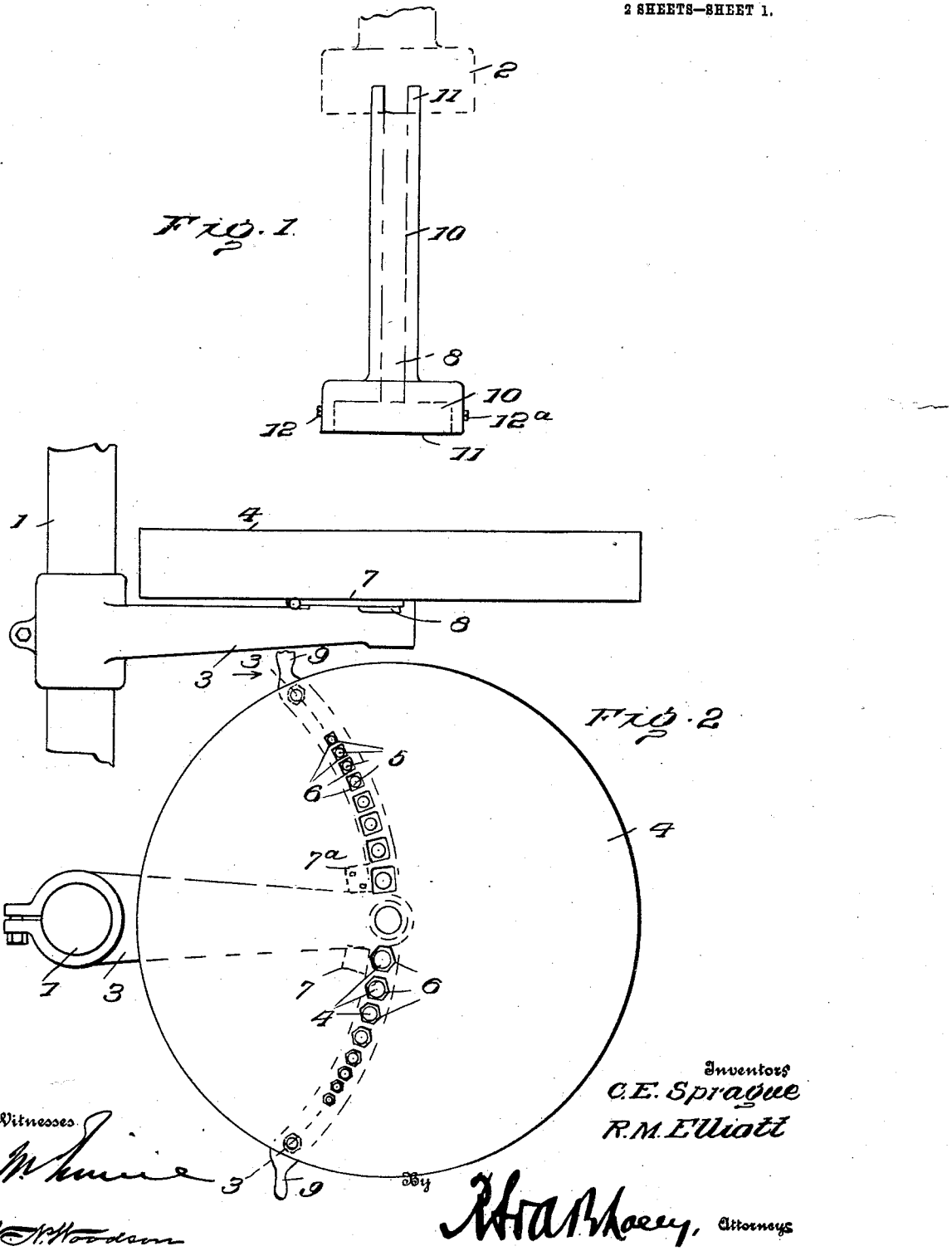

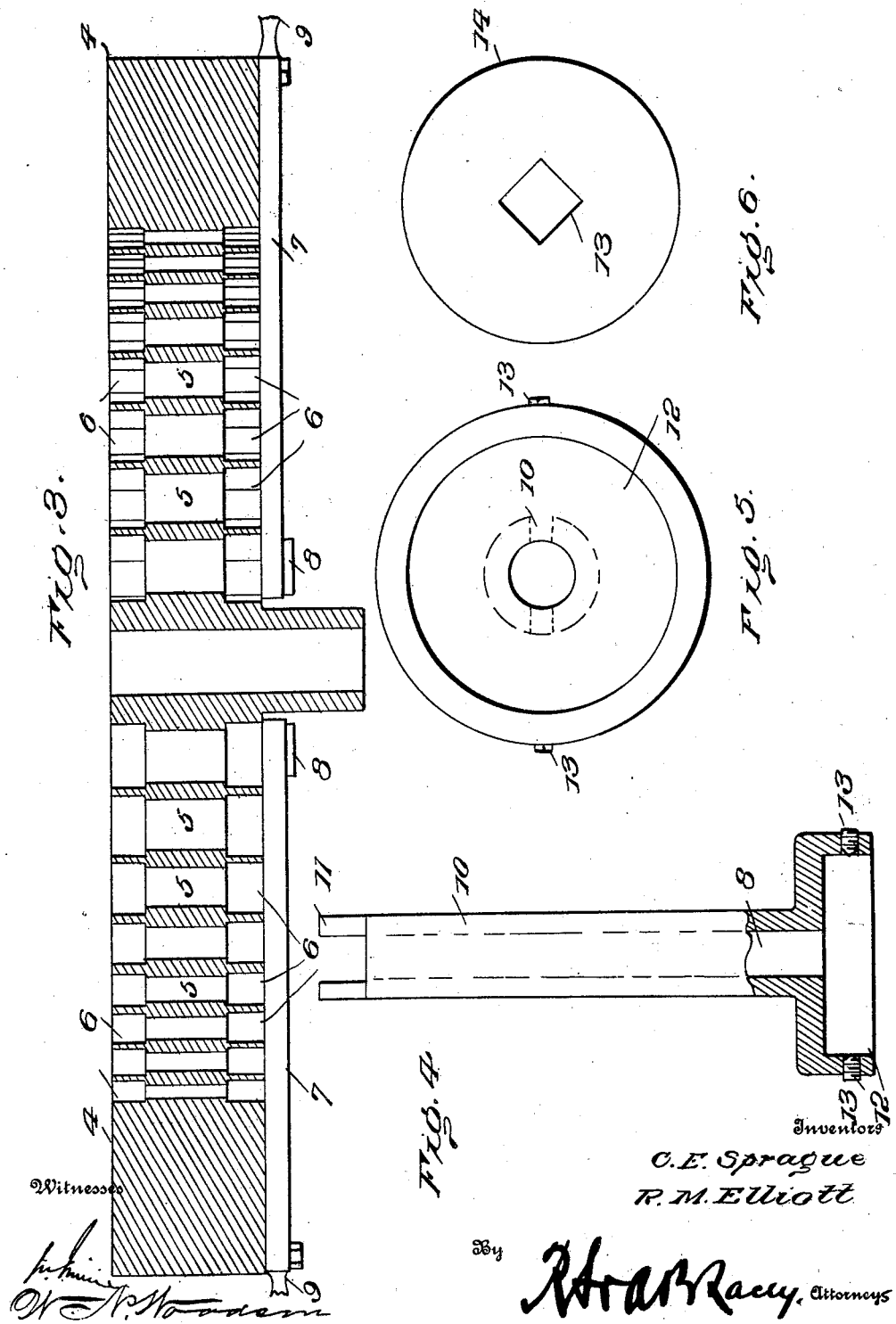

CLAUDE E. SPRAGUE AND RANDOLPH M. ELLIOTT, OF CHATTAROY, WASHINGTON.

ATTACHMENT FOR DRILLING-MACHINES.

No. 924,699.

Specification of Letters Patent.

Patented June 15, 1909.

Application filed August 13, 1908. Serial No. 448,449.

*To all whom it may concern:*

Be it known that we, CLAUDE E. SPRAGUE and RANDOLPH M. ELLIOTT, citizens of the United States, residing at Chattaroy, in the county of Spokane and State of Washington, have invented certain new and useful Improvements in Attachments for Drilling-Machines, of which the following is a specification.

The present invention relates to improvements in threading and tapping devices and has for its object to simplify the threading of nuts and bolts and to provide a device by means of which nuts and bolts may be quickly and accurately threaded in a uniform manner.

The invention further contemplates a device of this character which is simple and durable in its construction and will operate effectively upon any of the standard sizes of bolts or nuts.

For a full understanding of the invention and the merits thereof and also to acquire a knowledge of the details of construction and the means for effecting the result, reference is to be had to the following description and accompanying drawings, in which:

Figure 1 is a side elevation showing the invention applied to a drill, portions of the drill being removed. Fig. 2 is a top plan view of the table. Fig. 3 is an enlarged sectional view through the table on the line 3—3 of Fig. 2. Fig. 4 is an enlarged detail view of the die holder. Fig. 5 is an end view of the same. Fig. 6 is a plan view of the die stock which is designed to be clamped within the socket at the end of the die holder for the purpose of engaging the shank of a tap.

Corresponding and like parts are referred to in the following description and indicated in all the views of the drawings by the same reference characters.

The invention is designed to be applied to an ordinary drill of which the numeral 1 designates the column and 2 the chuck. Rotatably mounted upon the column 1 is an arm 3 and secured at its central point to the outer end of this arm is a circular table 4. This table is formed with a series of openings 5 which are designed to receive the bolts to be threaded and are arranged in the arc of a circle of which the axis of the column 1 is the center. These openings are further arranged so that by moving the arm 3 and swinging the table any selected one of the openings may be brought immediately under the chuck 2. It will also be observed that these openings are of various sizes so as to receive any standard size of bolt and as shown on the drawing the openings gradually decrease in size from the center of the table toward the periphery thereof. At the top and bottom of the table these openings communicate with sockets 6 which are also of various sizes and are designed to receive the nuts. In the present embodiment of the invention those sockets upon one side of the center of the table are rectangular in shape and are designed to receive square nuts while the sockets upon the opposite side of the table are hexagonal in shape and are designed to receive hexagonal nuts. Pivoted upon the lower face of the table 4 at each side thereof and toward its periphery is a plate 7, the said plates being designed to be swung over the sockets 6 at the bottom of the table so as to close the sockets and retain the bolt to be operated upon securely in position. The inner ends of these plates 7 engage stops 8 when they have been swung into operative position while the outer or pivot ends of the plates are formed with the finger-pieces 9 which project outwardly beyond the edges of the table and constitute a means for manipulating the plates.

The numeral 10 designates a die holder which has a tubular formation, the upper end of the die holder being engaged by the chuck 2 and being provided with the tongues or extensions 11, while the lower end of the die holder is enlarged and formed with a socket 12. This socket is designed to receive either a threading die which is clamped in position by the set screws 13 or a die stock 14 which is held in position in a similar manner and is formed at its central portion with an angular opening for the reception of the shank of a tap.

When it is desired to thread a bolt the proper die is clamped in the socket 12 and the die holder applied to the chuck, the bolt being inserted through the proper opening 5 and locked in position therein by means of one of the plates 7. The table 4 can then be swung to position the bolt immediately under the die and the machine set in operation. Owing to the fact that the die holder 10 is tubular the bolt will enter the same as soon as it has passed through the die and threads may be placed upon the bolt for a considerable portion of its length. In a somewhat similar manner should it be desired to thread a nut the proper die stock 14 is clamped in the socket 12 and the shank of the tap inserted through the opening of the die stock. The nut is then placed within one of the sockets 6 and the table 4 moved to position the nut immediately under the tap previous to setting the machine in operation. After the tap has passed through the nut it can be withdrawn from the die stock without reversing the drill, while when a die is employed for threading a bolt it is necessary to reverse the drill and run the die off after the bolt has been threaded the desired depth.

Having thus described the invention, what is claimed as new is:

1. The combination with a drill formed with a column and a chuck, of a swinging arm mounted upon the column, a table carried by the swinging arm and provided with a plurality of bolt receiving openings arranged in the arc of a circle of which the axis of the column is the center, any selected one of the bolt receiving openings being adapted to be moved into coöperative relation with the chuck by swinging the arm.

2. The combination with a drill formed with a column and a chuck, of a swinging arm mounted upon the column, a table carried by the swinging arm and provided with a plurality of bolt receiving openings mounted in the arc of a circle of which the axis of the column is the center, any selected one of the openings being adapted to be moved into coöperative relation to the chuck, and a plate pivoted upon the table for holding the bolts in position within the bolt receiving openings.

In testimony whereof we affix our signatures in presence of two witnesses.

CLAUDE E. SPRAGUE. [L. S.]
RANDOLPH M. ELLIOTT. [L. S.]

Witnesses:
 PETER P. SWANSON,
 FELIX VON MUKWILZ.